(12) United States Patent
Campomanes et al.

(10) Patent No.: US 8,387,290 B2
(45) Date of Patent: Mar. 5, 2013

(54) CONNECTOR PIN ASSEMBLY WITH DUAL FUNCTION OUTER END PORTIONS, AND ASSOCIATED GROUND ENGAGING APPARATUS

(75) Inventors: Patrick Campomanes, Coppell, TX (US); Isai Diaz, Arlington, TX (US)

(73) Assignee: Hensley Industries, Inc., Dallas, TX (US)

( * ) Notice: Subject to any disclaimer, the term of this patent is extended or adjusted under 35 U.S.C. 154(b) by 0 days.

(21) Appl. No.: 13/156,495

(22) Filed: Jun. 9, 2011

(65) Prior Publication Data

US 2012/0055052 A1 Mar. 8, 2012

Related U.S. Application Data

(60) Provisional application No. 61/380,776, filed on Sep. 8, 2010.

(51) Int. Cl.
*E02F 9/28* (2006.01)
(52) U.S. Cl. .......................................... 37/456; 403/320
(58) Field of Classification Search .................. 37/452, 37/453, 454, 455, 456, 457, 458, 459; 172/772, 172/772.5; 403/320
See application file for complete search history.

(56) References Cited

U.S. PATENT DOCUMENTS

| | | | | |
|---|---|---|---|---|
| 2,762,139 | A * | 9/1956 | Launder | 37/453 |
| 3,020,655 | A * | 2/1962 | Launder | 37/453 |
| 6,053,655 | A * | 4/2000 | Mazhar | 403/320 |
| 6,708,431 | B2 | 3/2004 | Robinson et al. | |
| 6,799,386 | B2 | 10/2004 | Robinson et al. | |
| 6,976,325 | B2 * | 12/2005 | Robinson et al. | 37/456 |
| 7,069,676 | B2 | 7/2006 | Robinson et al. | |
| 7,121,023 | B2 | 10/2006 | Robinson et al. | |
| 7,174,661 | B2 | 2/2007 | Briscoe | |
| 7,313,877 | B2 * | 1/2008 | Clendenning et al. | 37/456 |
| 7,603,799 | B2 | 10/2009 | Campomanes | |
| 7,681,341 | B2 | 3/2010 | Ruvang | |
| 2005/0274047 | A1 * | 12/2005 | Pippins | 37/455 |
| 2007/0261278 | A1 * | 11/2007 | Campomanes | 37/452 |
| 2008/0209772 | A1 * | 9/2008 | Cui | 37/456 |

OTHER PUBLICATIONS

International Searching Authority/U.S., PCT Notification of Transmittal of the International Search Report and the Written Opinion of the International Searching Authority, or the Declaration mailed Dec. 13, 2011, for PCT Application No. PCT/US2011/046356; 11 pages, Alexandria, Virginia.

\* cited by examiner

*Primary Examiner* — Jamie L McGowan
(74) *Attorney, Agent, or Firm* — Haynes and Boone, LLP

(57) ABSTRACT

A connector pin assembly is insertable into aligned openings in telescoped ground engaging wear and support members to releasably hold the wear member on the support member. The assembly has a tubular outer housing that is nonrotatably received in the openings. A connector pin longitudinally extends through the housing and is rotatable relative thereto among selectively variable rotational orientations in which the pin is releasably locked to the housing by cooperative detent structures carried by the housing and the pin. Outer end portions of the pin perform two functions which are controlled by rotating the pin relative to the housing. First, outer pin member end portions are rotatable to selectively hold the wear member on the support member or release it therefrom. Second, the outer pin end portions are rotatable to adjustably tighten the wear member onto the support member.

46 Claims, 17 Drawing Sheets

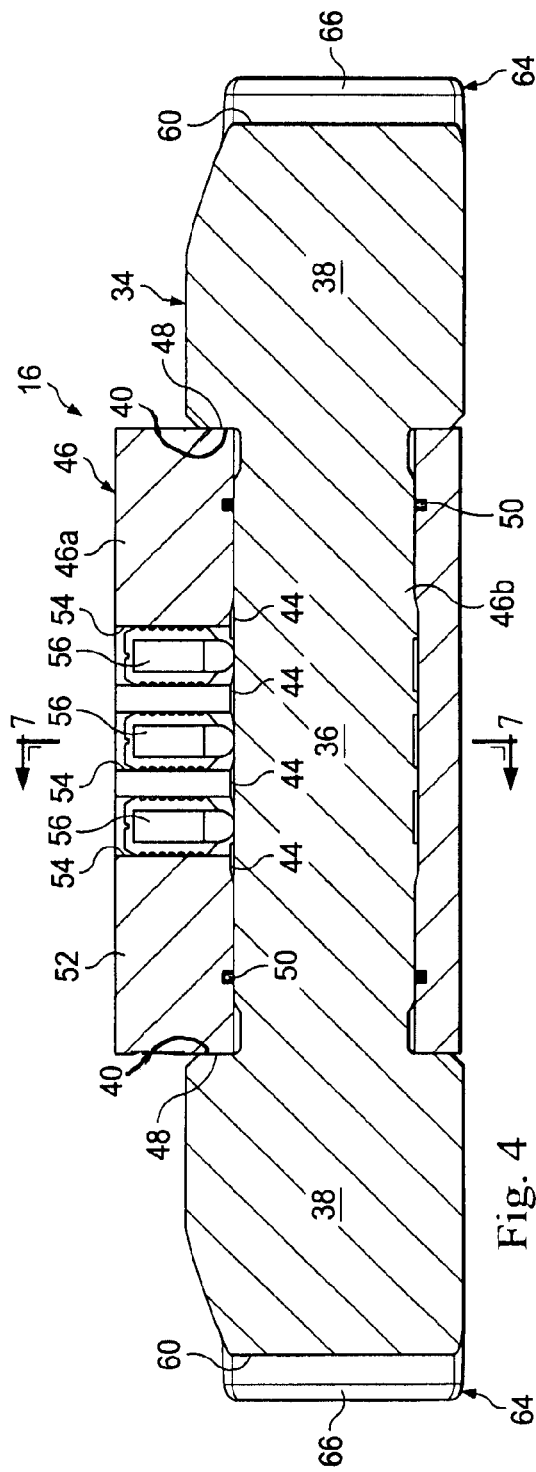
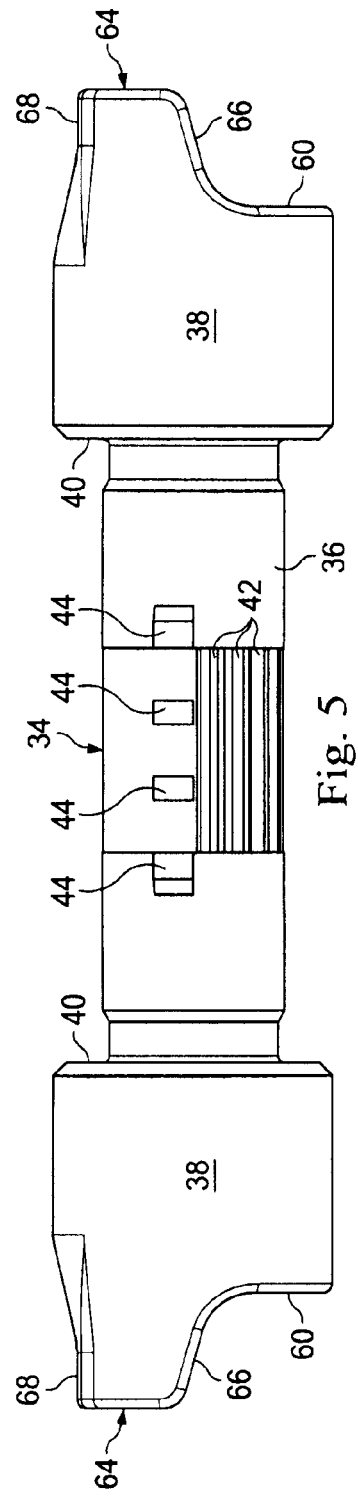

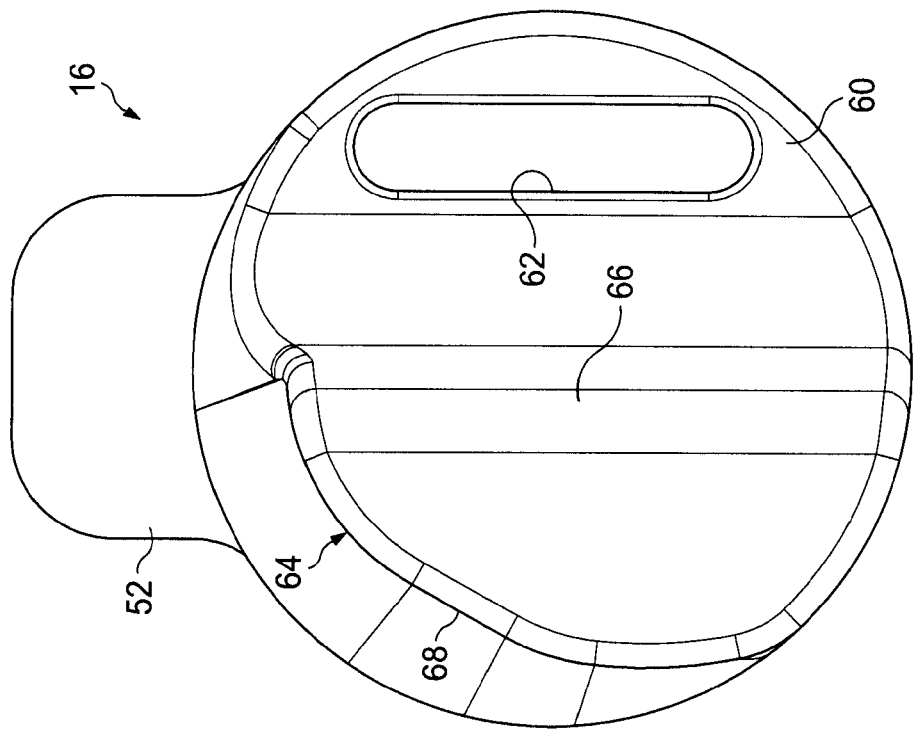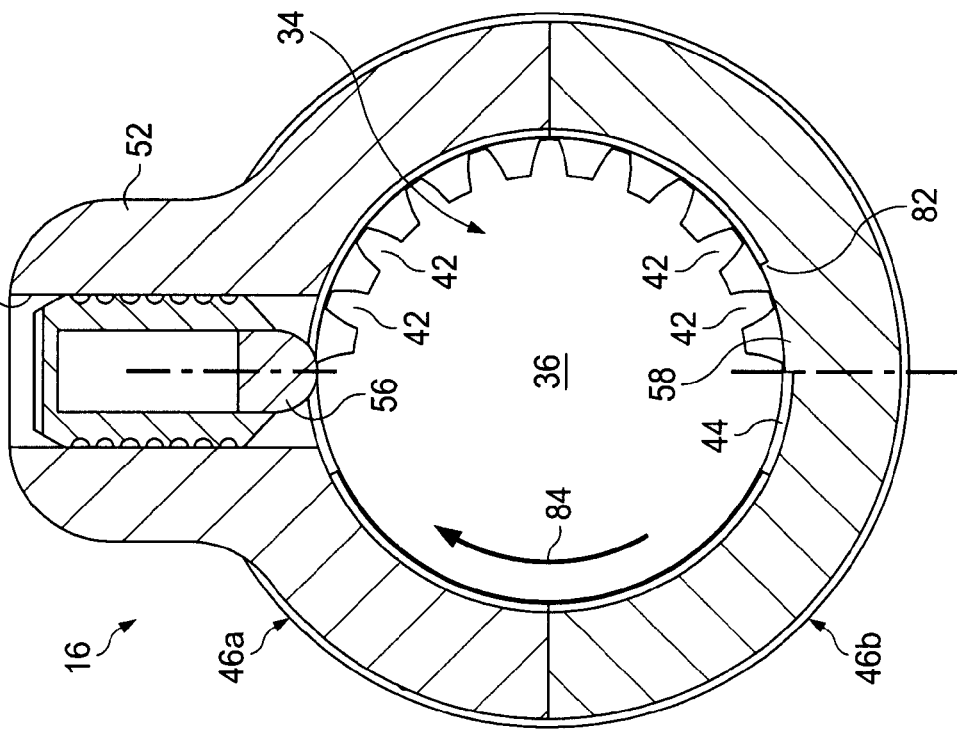

US 8,387,290 B2

CONNECTOR PIN ASSEMBLY WITH DUAL FUNCTION OUTER END PORTIONS, AND ASSOCIATED GROUND ENGAGING APPARATUS

CROSS-REFERENCE TO RELATED APPLICATION

This application claims the filing benefit of U.S. Provisional Application Ser. No. 61/380,776 filed on Sep. 8, 2010, such provisional application being incorporated herein by reference in its entirety.

BACKGROUND OF THE INVENTION

The present invention generally relates to ground engaging apparatus and, in a representatively illustrated embodiment thereof, more particularly relates to a specially designed connector pin assembly operative to releasably connect a ground engaging wear member to a support structure in a telescoped relationship therewith.

In the ground engaging art a need exists for an improved connector pin apparatus useable to releasably couple a replaceable wear member, such as a tooth point or intermediate adapter, to a support structure, such as a base adapter, onto which the wear member is telescoped, with the connector pin apparatus being (1) installable without the need to hammer it into aligned openings in the telescoped support structure and wear member, and (2) adjustable to provide corresponding operational wear adjustments to the support structure and wear member to periodically "tighten" the wear member onto the support structure as needed. It is to this need that the present invention is primarily directed.

BRIEF DESCRIPTION OF THE DRAWINGS

FIG. 4 is a cross-sectional view through the connector pin assembly taken generally along line 4-4 of FIG. 3;

FIG. 5 is an enlarged scale side elevational view of the connector pin assembly with an outer housing portion removed therefrom for illustrative purposes;

FIG. 7 is an enlarged scale cross-sectional view through the connector pin assembly taken generally along line 7-7 of FIG. 4;

FIG. 8 is an enlarged scale end elevational view of the connector pin assembly taken generally along line 8-8 of FIG. 3;

DETAILED DESCRIPTION

Figure 1:
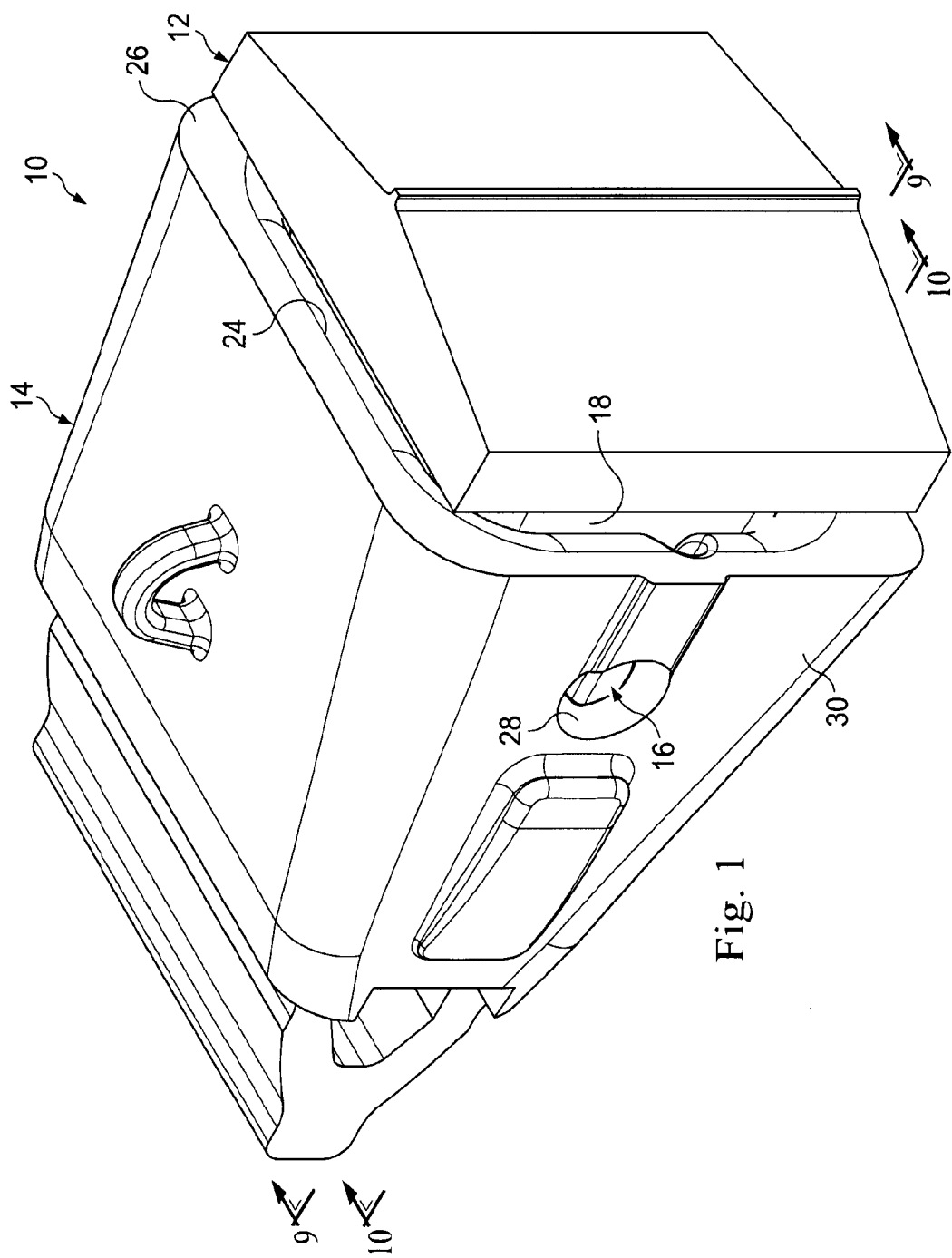
FIG. 1 is a perspective view of representative ground engaging apparatus incorporating therein a specially designed connector pin assembly embodying principles of the present invention.
Figure 2:
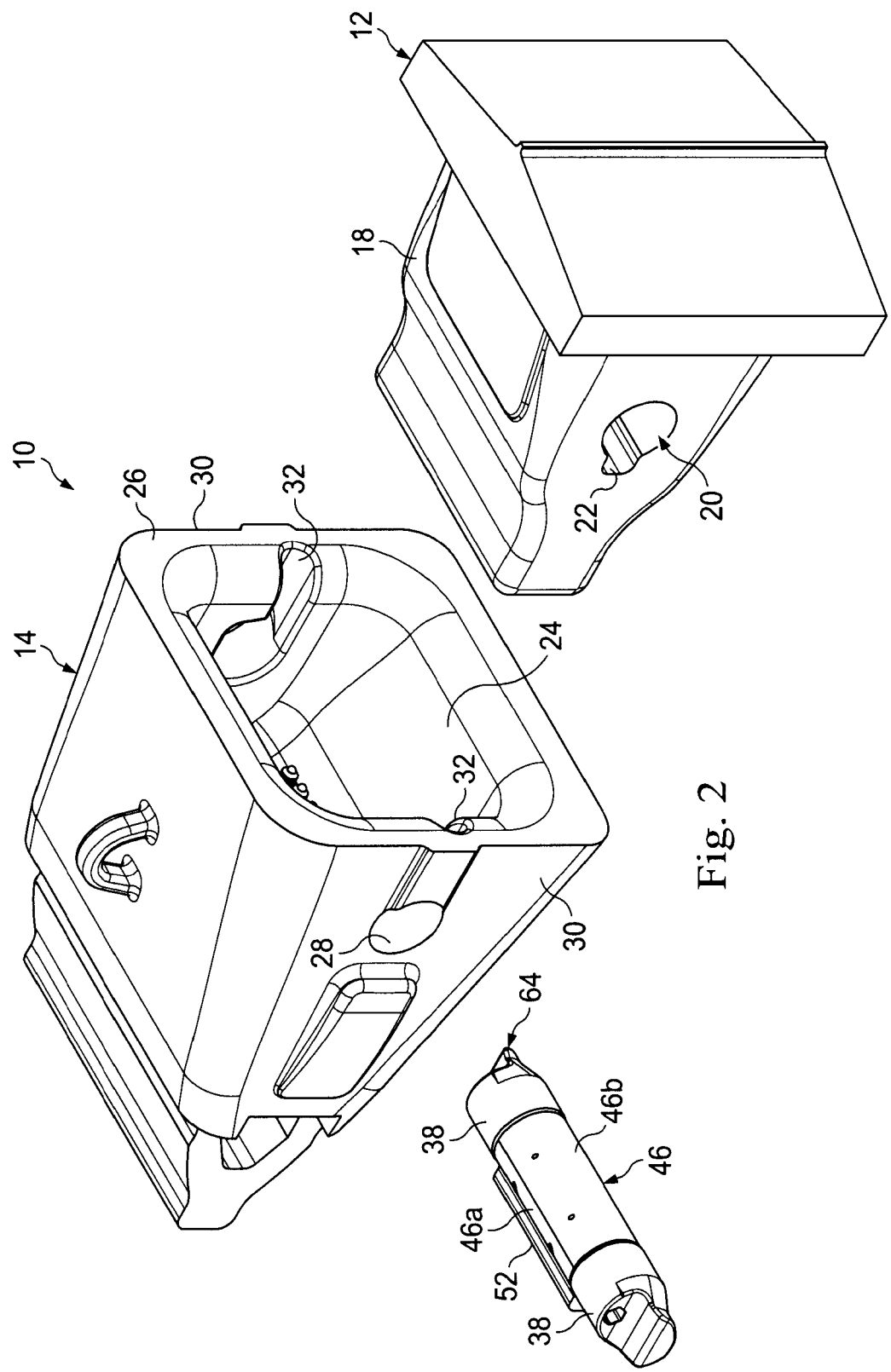
FIG. 2 is an exploded perspective view of the ground engaging apparatus.
Figure 9:
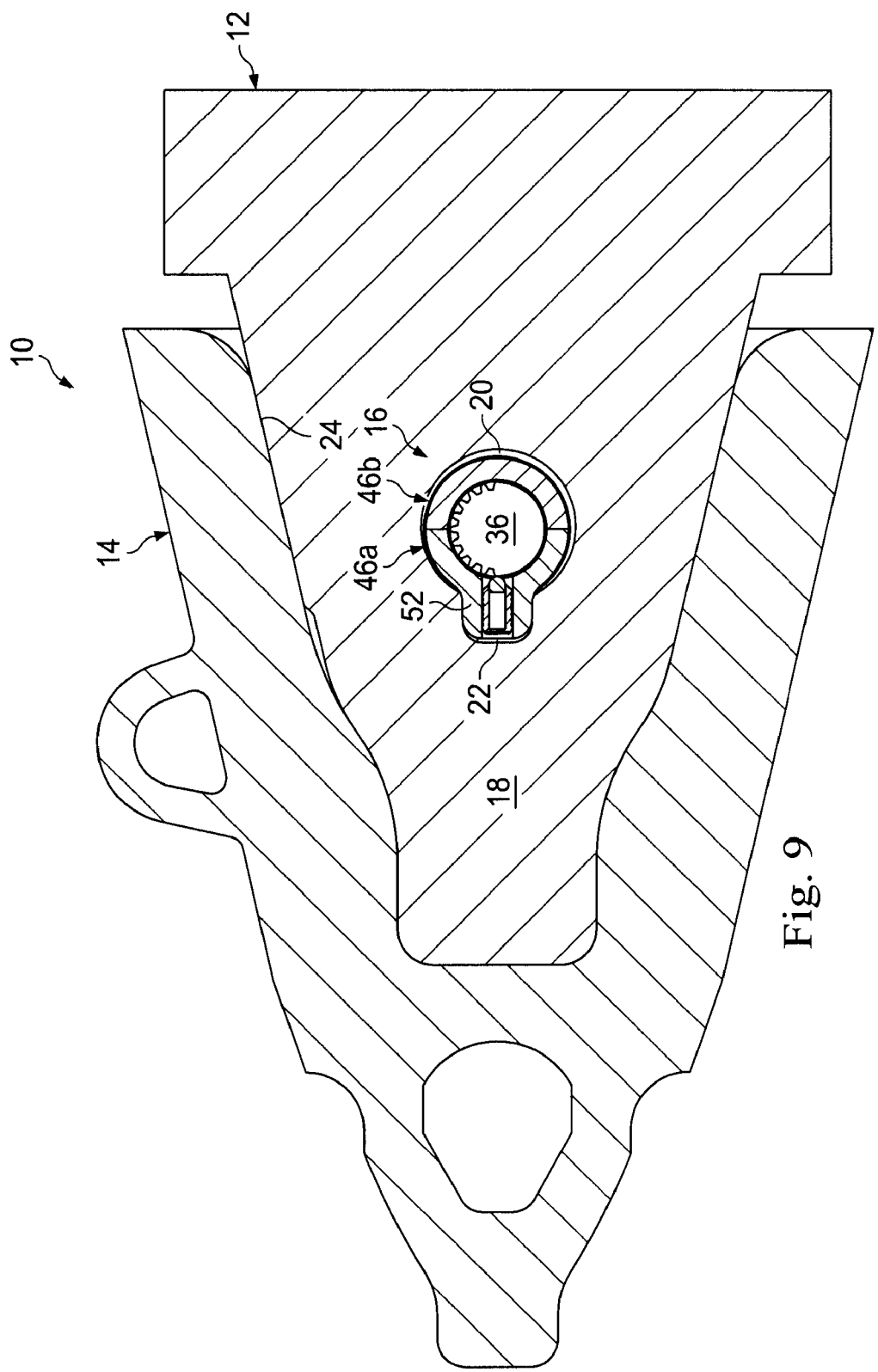
FIG. 9 is an enlarged scale cross-sectional view through the ground engaging apparatus taken generally along line 9-9 of FIG. 1.

Referring initially to FIGS. 1, 2 and 9, the present invention provides ground engaging apparatus 10 useable in various earth working applications and comprising a support structure 12, a replaceable wear member 14, and a specially designed connector pin assembly 16 embodying principles of the present invention.

The support structure 12 is representatively a base adapter having a tapered front nose portion 18. Alternatively, the support structure could be an intermediate adapter or another type of support structure. Extending horizontally through the adapter nose 18 between its opposite vertical sides is a connector opening 20 having a generally circular cross-section with a radially enlarged front portion defining a front retaining recess portion 22 of the opening 20.

Replaceable wear member 14 is representatively an intermediate adapter, but could alternatively be a tooth point or other type of replaceable wear member. A tapered pocket area 24 extends forwardly through the rear end 26 of the wear member 14 and, as best illustrated in FIG. 9, is configured to complementarily receive the adapter nose 18 when the wear member 14 is telescoped onto the adapter nose 18. With the wear member 14 operatively disposed on the adapter nose 18, connector pin openings 28 (only one of which is visible) extending through opposite vertical side walls 30 of the wear member 14 into the pocket 24 are aligned with the nose connector opening 20.

Interior side surface recesses 32 (FIG. 2) are formed in the opposite vertical side walls 30 of the wear member 14, the recesses 32 horizontally extending forwardly through the rear end 26 of the wear member 14 and terminating at their forward ends at the connector openings 28. Connector openings 28 and their associated interior side surface recesses 32 are respectively similar in configuration to the connector opening 36 and the side surface recess 40 formed in the replaceable tooth point 14 shown in FIG. 3 of U.S. Pat. No. 6,708,431 which is hereby incorporated in its entirety by reference in this application.

With reference now to FIGS. 3-8, the connector pin assembly 16 comprises a solid metal elongated cylindrical connector pin member 34 having a fixed axial length and a central longitudinal portion 36 (FIGS. 4-6) disposed between two larger diameter end portions 38, the junctures between the central portion 36 and the end portions 38 forming spaced apart annular ledges 40. The central pin member portion 36 has a circumferentially spaced series of axially extending detent grooves 42 formed in its side surface, and an axially spaced series of laterally outwardly projecting stop portions 44 circumferentially adjacent one side of the groove array.

Figure 3:
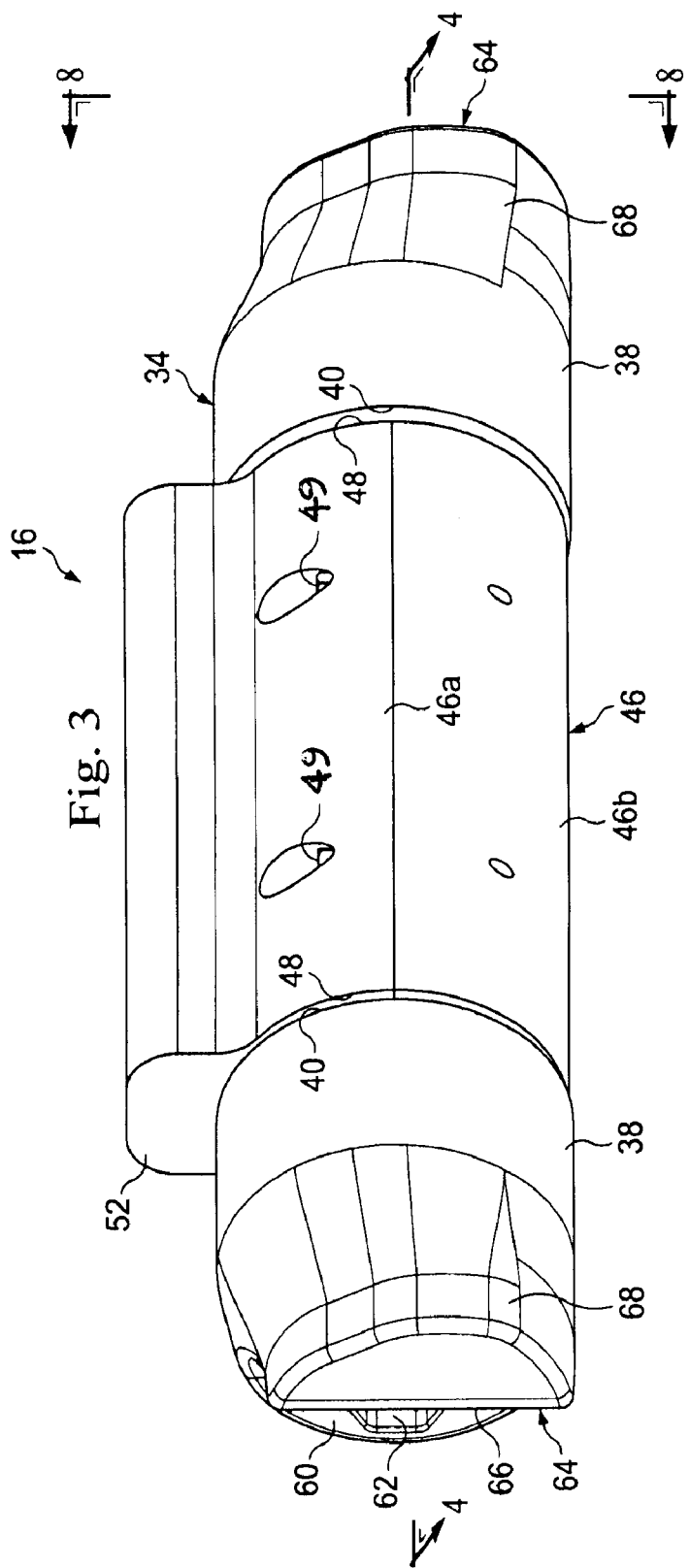
FIG. 3 is an enlarged scale perspective view of the connector pin assembly.
Figure 6:
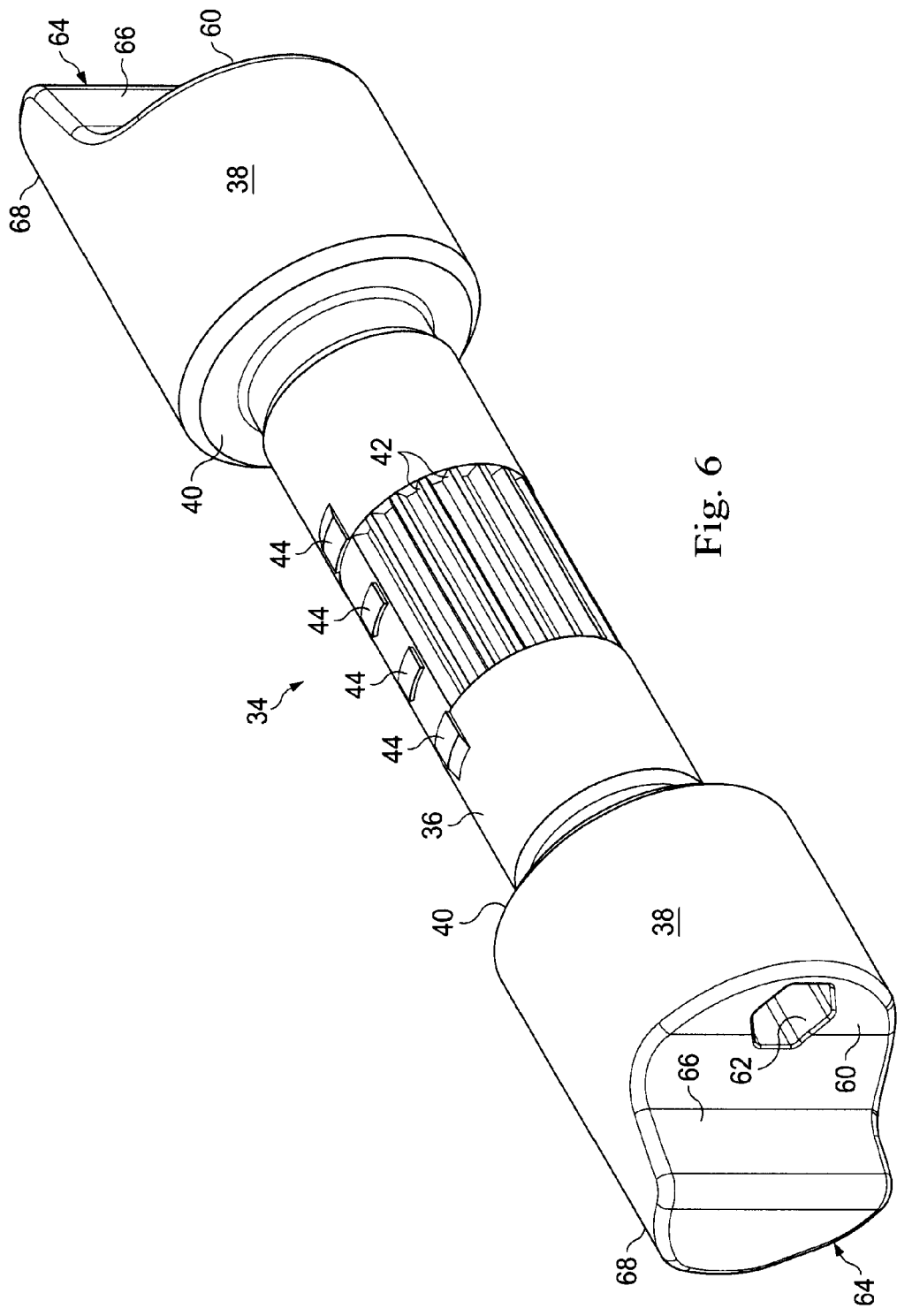
FIG. 6 is a perspective view of the connector pin assembly portion of FIG. 5.

A tubular housing 46 (FIGS. 3, 4 and 7) having opposite ends 48 circumscribes the central connector pin portion 36 with the housing ends 48 facing and being closely adjacent the annular ledges 40. The pin member 34 is rotatable relative to the housing 46, but the ledges 40 block axial movement of the pin member 34 relative to the housing 46. The tubular housing 46 is formed from two lateral halves 46a, 46b interconnected by threaded fasteners 49 (FIG. 3). O-ring seals 50 (FIG. 4) are provided at interface areas between the housing 46 and the central pin member portion 36. Along its length the housing portion 46a has a laterally outwardly projecting rib portion 52 (FIGS. 3, 4 and 7) having lateral openings 54 (FIG. 4) extending therethrough to the inner side surface of housing portion 46a. Operatively disposed in openings 54 are spring-loaded detent members 56 with inner ends positioned to resiliently snap into selectively variable ones of the pin member side surface detent grooves 42 (FIG. 7). Formed on the inner side surface of the housing portion 46b is a radially inwardly projecting stop portion 58 serving, as later described herein, as a rotational abutment for the stop projections 44 on the central pin portion 36.

Each of the opposite end portions 38 of the connector pin member 34 has a substantially planar, axially facing surface portion 60 (FIGS. 4-6) inwardly through which a noncircular drive opening 62 (FIGS. 3, 6 and 8) extends. Drive openings 62 are configured to receive a portion of an appropriate tool (not shown) used to rotate the pin member 34 relative to the housing 46. As illustrated, such drive openings 62 may have either an elongated oval configuration or a hexagonal configuration, or may alternatively have another suitable configuration if desired.

Extending transversely outwardly from each of the planar end surfaces 60, and laterally offset from the longitudinal axis of the pin member 34, is a combination locking/adjusting projection 64. Each projection 64 (FIGS. 3-6 and 8) has a flat inner side surface 66 extending generally chordwise relative to the end surface 60 and an opposite, eccentrically curved outer side cam surface 68. Viewed from the ends of the pin member 34 (FIG. 8), each projection 64 is within the peripheral envelope of its associated pin member end portion 38. As will now be described in conjunction with FIGS. 9-10B, these specially configured pin end portions 64 uniquely perform two functions—namely, (1) they serve to releasably lock the wear member 14 on the adapter nose 18 and permit installation and removal of subsequent wear members without removing the connector pin assembly 16 from the adapter nose 18, and (2) they may be utilized to periodically "tighten" the wear member 14 on the nose 18 as the interface between the wear member 14 and the nose loosens due to operational wear.

Turning first to FIG. 9, to position and releasably lock a new wear member 14 on the adapter nose 18, the connector pin assembly 16 is first inserted in the nose opening 20, without having to pound the connector pin assembly 16 into place, in a manner such that the housing rib 52 is complementarily received in the front nose opening recess 22. This prevents rotation of the housing 46 relative to the nose 18. However, as previously mentioned, the pin member connector pin member 34 is rotatable relative to the housing 46. With the pin end portions 64 (which are identically oriented on their respective pin portions 34) in their FIG. 10 orientation (i.e., flat side surface 66 up as viewed in FIG. 10), the wear member 14 is rearwardly moved onto the nose 18 as indicated by the arrow 70 in FIG. 10. This causes the pin end portions 64 to move forwardly through their associated wear member side surface recesses 32, as indicated by the arrow 72 in FIG. 10 until the wear member 14 rearwardly reaches its FIG. 10 position.

Figure 10:
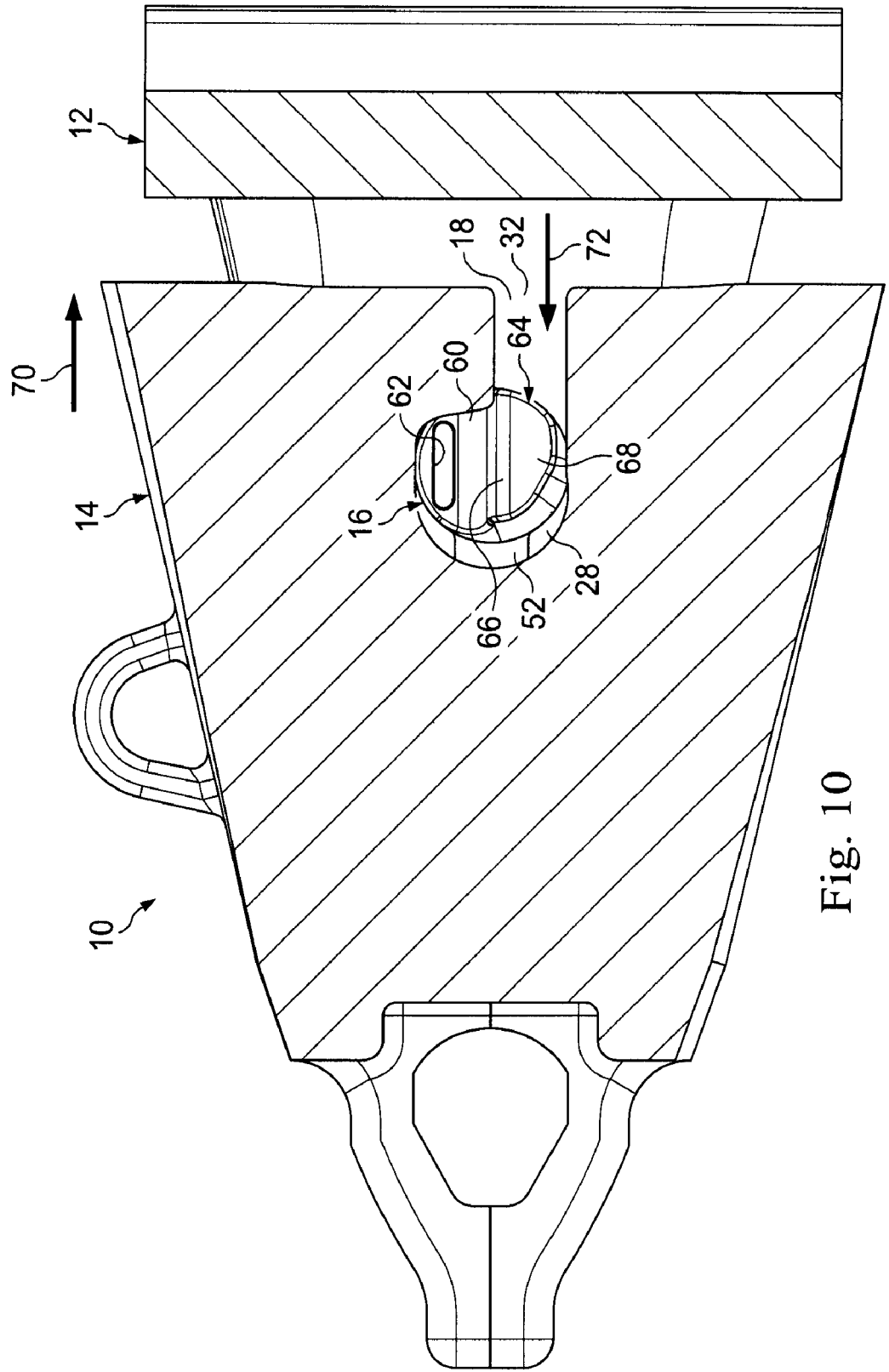
FIGS. 10-10B are enlarged scale cross-sectional views through the ground engaging apparatus, taken generally along line 10-10 of FIG. 1, and sequentially illustrate the operation of the installed connector pin assembly.
Figure 10A:
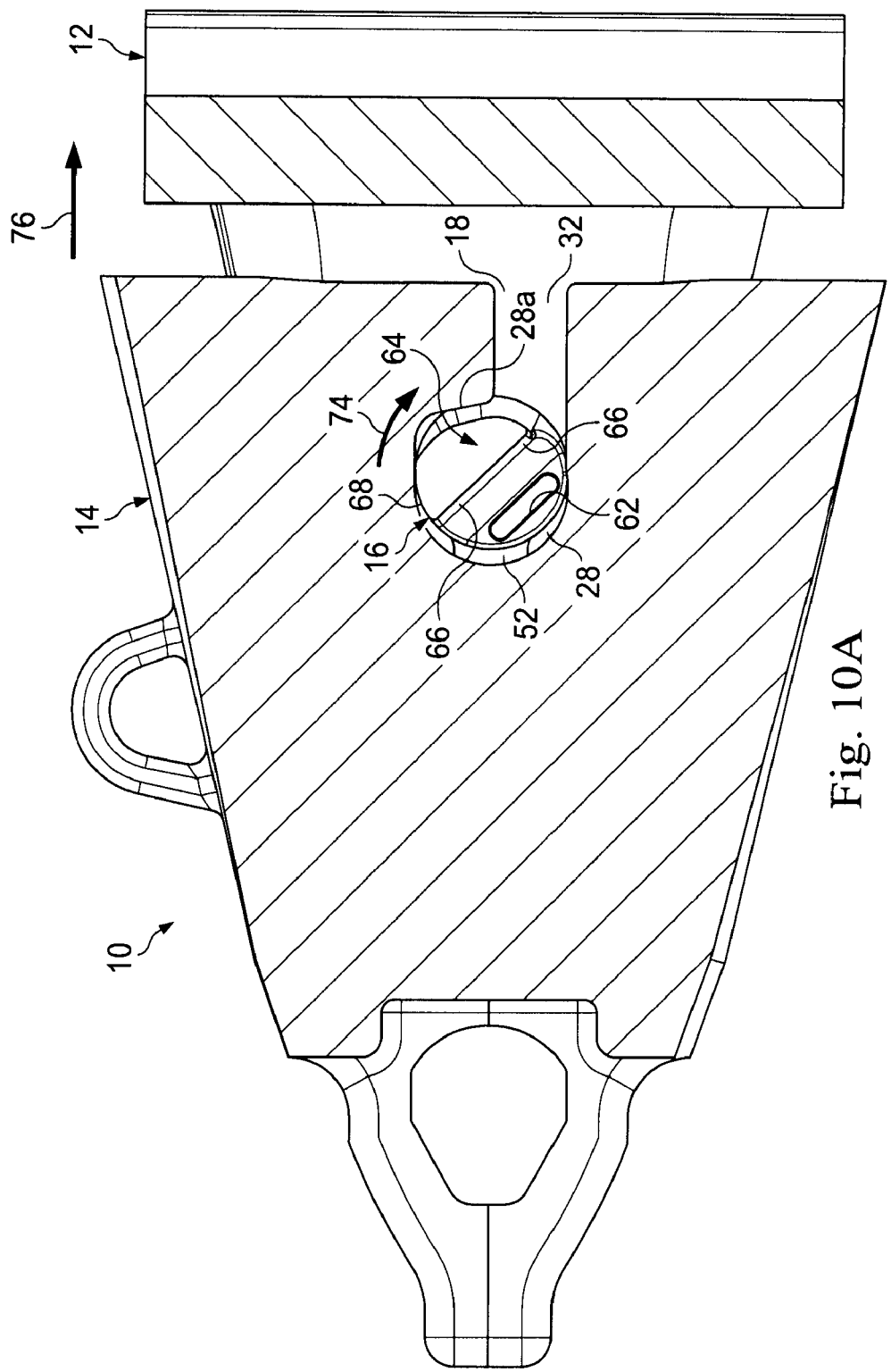

Next, using one of the drive openings 62, the connector pin 34 is rotated in a clockwise direction, as indicated by the arrow 74 in FIG. 10A, to bring each cam surface 68 into forcible engagement with a rear interior surface portion (generally at location 28a) of its associated wear member opening 28 to thereby rearwardly move the wear member 14, as indicated by the arrow 76 in FIG. 10A to an initially tightened position of the wear member 14 on the adapter nose 18. When the wear member 14 reaches this position, the detent members 56 (FIG. 7) snap into one of the underlying pin member detent grooves 42 to thereby resiliently hold the rotated pin member 34 in its rotationally adjusted position. As can be readily be seen in FIG. 10A, the engagement of the rotated cammed pin end portions 64 with the rear surface portions 28a of the wear member openings 28 not only holds the wear member 14 in its initially tightened orientation on the adapter nose 18, but also blocks the forward dislodgement of the wear member from the nose 18.

Figure 10B:
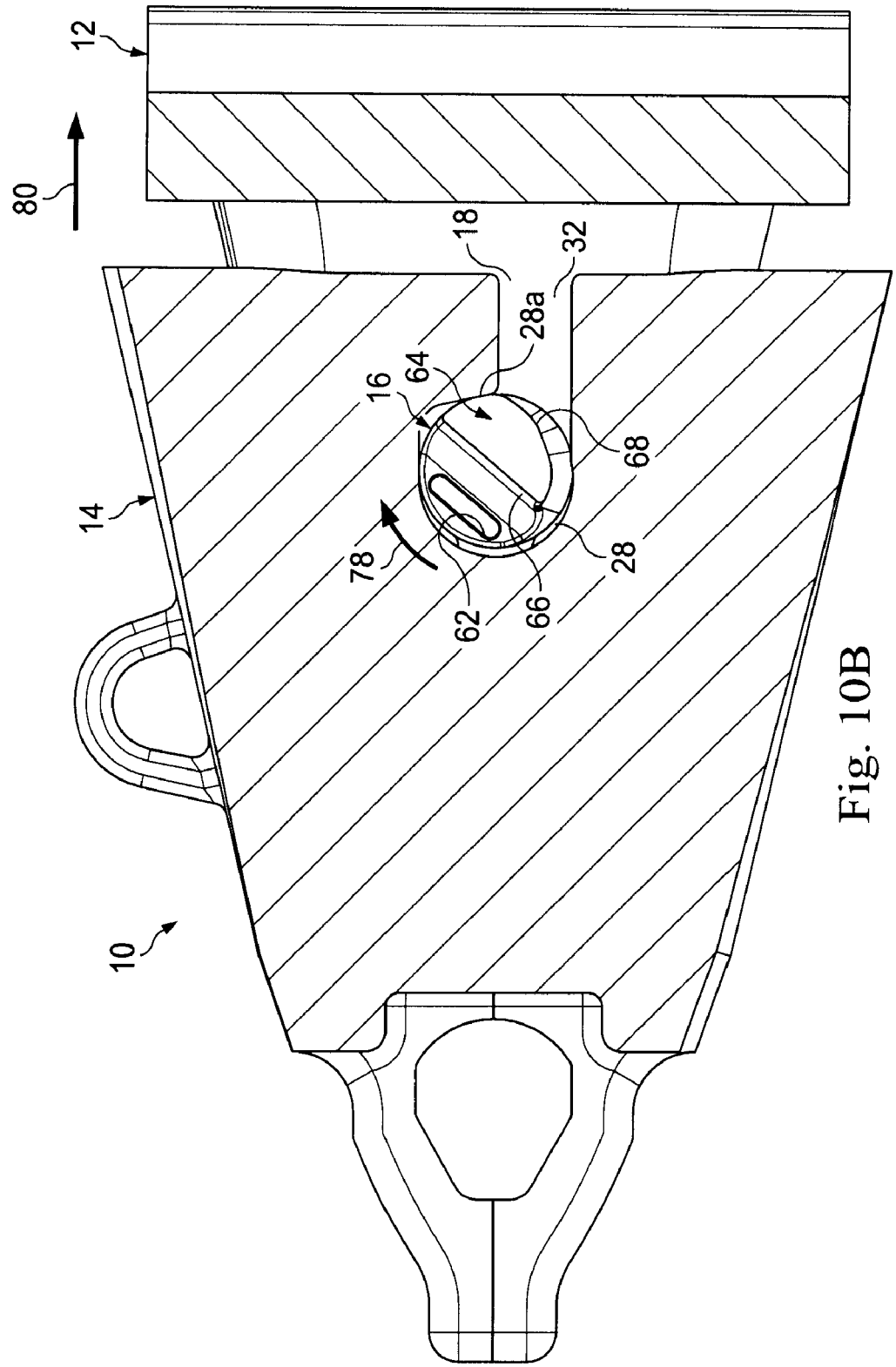

With reference now to FIG. 10B, when further rearward tightening of the wear member 14 on the nose 18 is needed, all that is necessary is to further rotate the connector pin 34 in a clockwise direction, as indicated by the arrow 78 in FIG. 10B, to thereby engage "thicker" portions of the cammed pin end portions 64 with their associated rear areas 28a of the wear member openings 28, thereby rearwardly moving the wear member 14 along the nose 18 as indicated by the arrow 80 in FIG. 10b, and cause the detent members 56 to snap into another pin groove 42 to releasably retain the wear member 14 in its now further tightened orientation on the nose 18.

For purposes of explanation, the wear member 14 and the connector pin member 34 have been shown in their "finally" tightened orientations in FIG. 10B. However, it will be readily appreciated that there are a plurality of intermediately tightened orientations between those shown in FIGS. 10A and 10B owing to the multiple pin detent grooves 42 representatively utilized in the connector pin assembly 16. To prevent the clockwise rotation of the pin member 34 from its FIG. 10B orientation back to its FIG. 10 installation orientation (which would undesirably permit forward dislodgement of the wear member 14 from the nose 18), the rotational abutment elements 44 and 58 shown in FIG. 7 are relatively arranged in a manner such that when the connector pin 34 reaches its FIG. 10B finally tightened orientation, the abutment element 44 is brought into engagement with the right side surface 82 of the abutment element 58 to thereby prevent further tightening rotation of the connector pin 34 as indicated by the arrow 84 in FIG. 7.

When it is desired to remove the worn wear member 14 from the nose 18 the connector pin member 34 is simply rotated in a counterclockwise direction from its FIG. 10B orientation back to its FIG. 10 orientation which permits the cammed pin end portions 64 to pass rearwardly through the wear member interior side surface recesses 32 as the wear member 14 is pulled forwardly off the nose 18. A new wear member may then be installed on and initially tightened against the nose 18 as previously described herein.

Figure 11:
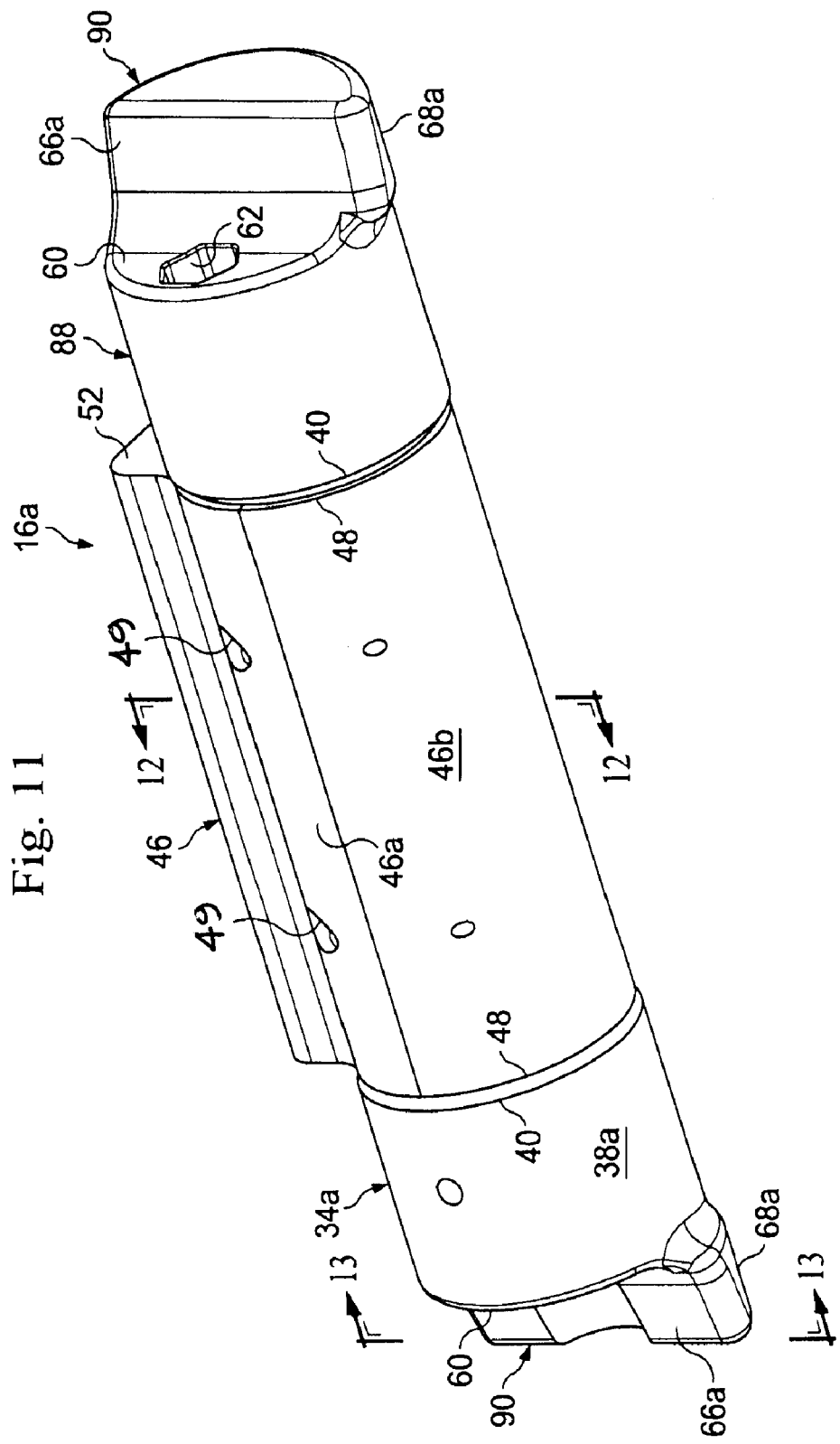
FIG. 11 is a perspective view of an alternate connector pin assembly embodiment.
Figure 12:
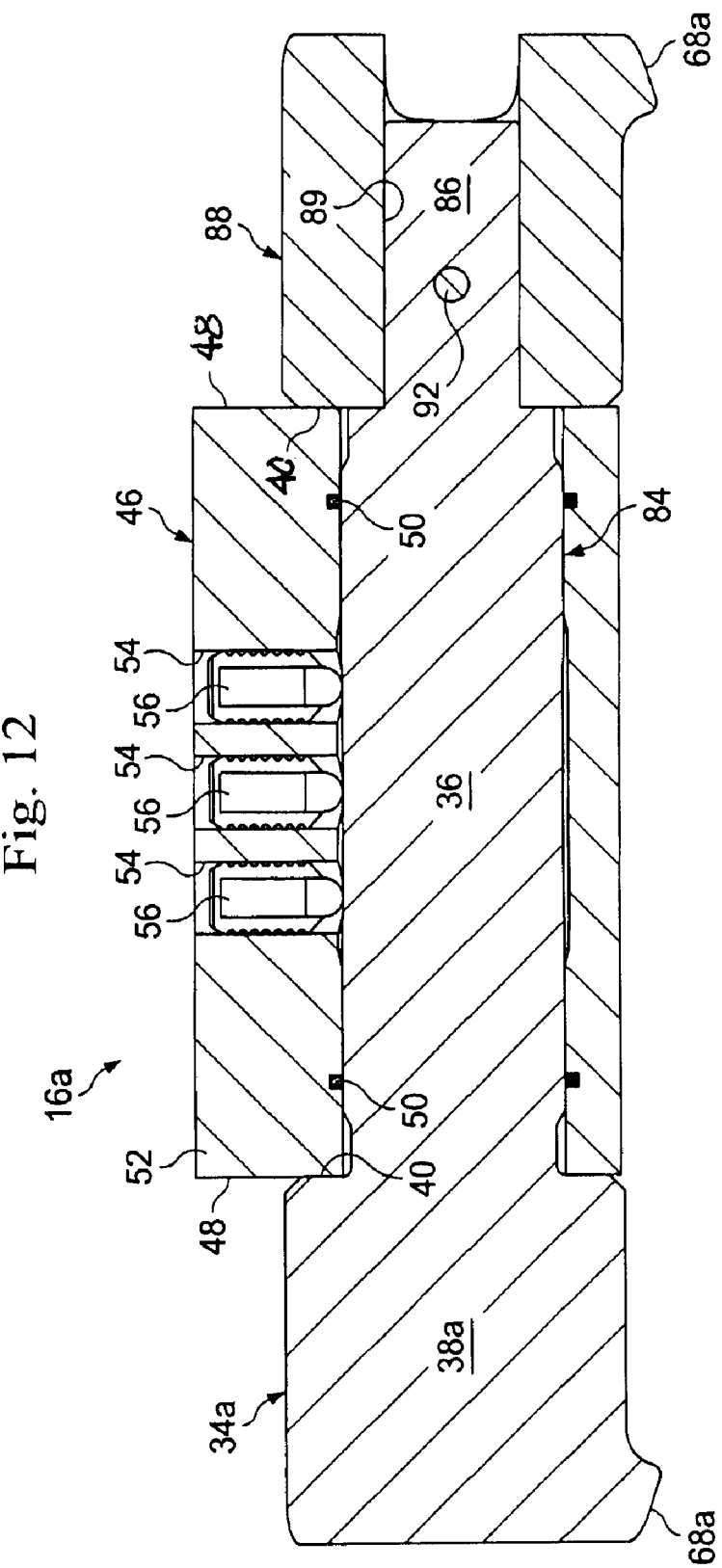
FIG. 12 is a cross-sectional view through the alternate connector pin assembly embodiment taken generally along line 12-12 of FIG. 11.
Figure 13:
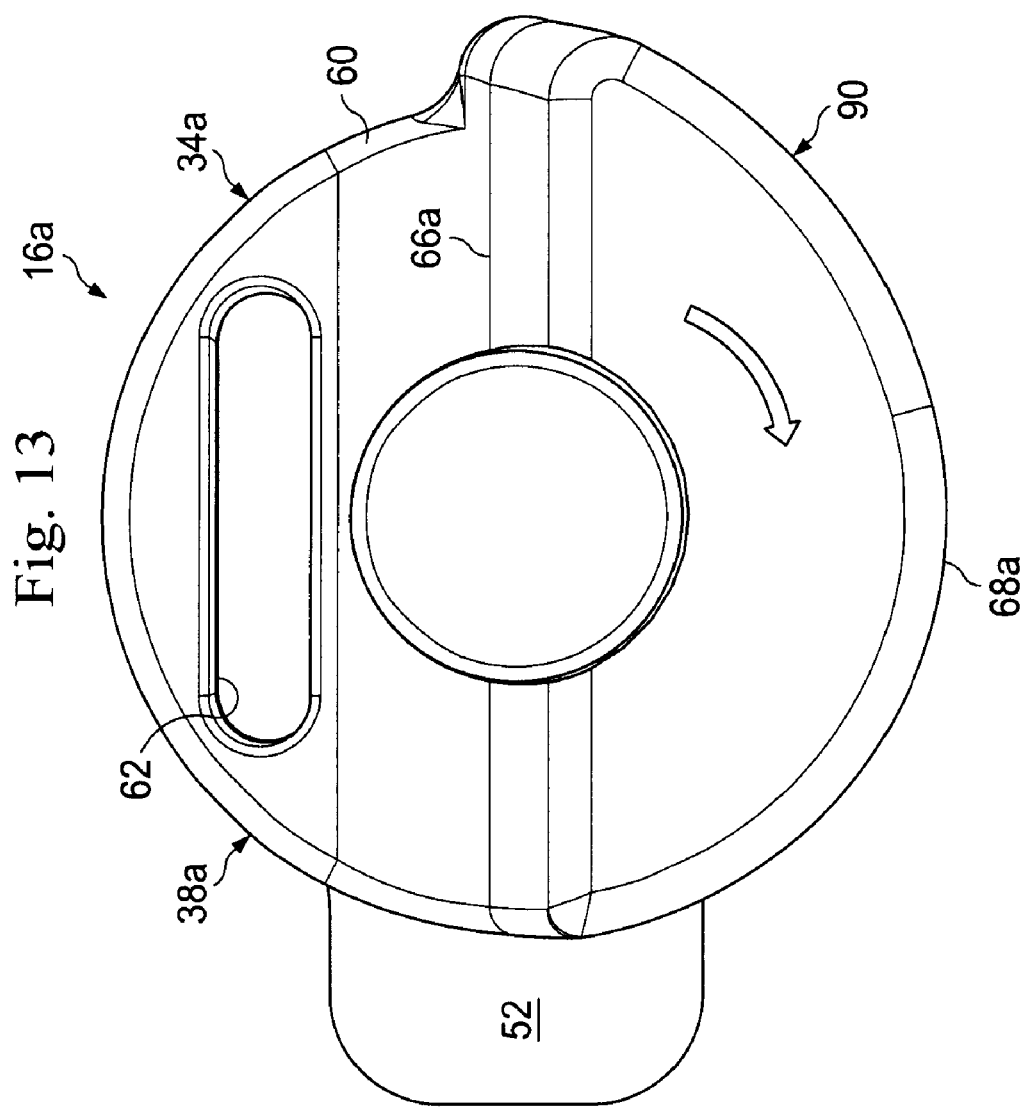
FIG. 13 is an enlarged scale end elevational view of the alternate connector pin assembly embodiment taken generally along line 13-13 of FIG. 11.

An alternate embodiment 16a of the previously described connector pin assembly 16 is illustrated in FIGS. 11-13. The connector pin assembly 16a utilizes the same tubular housing structure 46 as the connector pin assembly 16, but utilizes a modified connector pin member 34a which differs in two primary regards from the previously described connector pin member 34. First, the pin member 34*a* has a two-piece construction comprising, as may be best seen in FIG. 12, (1) an elongated first section 84 having the previously described central cylindrical portion 36, a modified enlarged diameter cylindrical left end portion 38*a*, and a cylindrical right end portion 86 having a reduced diameter relative to the diameter of the central portion 36, and (2) a tubular right end portion 88 with an axial opening 89 extending therethrough and sized to complementarily and slidably receive the right end portion 86.

Second, the end portions 38*a* and 88 of the modified connector pin member 34*a* have cammed pin end portions 90 which project outwardly from the end surfaces 60 of the end portions 38*a* and 88. Cammed end portions or projections 90 are shaped similarly to the previously described cammed pin member end portions 64, and have similar retention and tightening functions, but, as can be best seen in FIG. 13, project laterally outwardly beyond the peripheral envelopes of their associated pin end portions 38*a* and 88. Specifically, the cammed outer side surfaces 68*a* of the projections 90 are disposed laterally outwardly of their associated pin end portions 38*a* and 88.

Because the projections 90 laterally extend beyond their associated pin end portions 38*a* and 88, neither end of the modified connector pin assembly 16*a* as shown in FIGS. 11 and 12 can be inserted into and through the nose opening 20 (see FIGS. 2 and 9). Accordingly, to operatively install the modified connector pin assembly 16*a* in the nose opening 20, the end portion 88 is first removed from the pin end portion 86. The connector pin section 84 (with the tubular housing 46 thereon) is then inserted, right end first as viewed in FIG. 12, into and through one end of the nose opening 20 until the reduced diameter pin section 86 projects outwardly through the opposite end of the nose opening 20. The tubular pin member portion 88 is then telescoped onto the pin section 86 as shown in FIG. 12 and then fixedly secured thereto using a suitable connection structure such as the illustrated pin 92 or other suitable fastening structure such as a bolt or the like.

Figure 14:
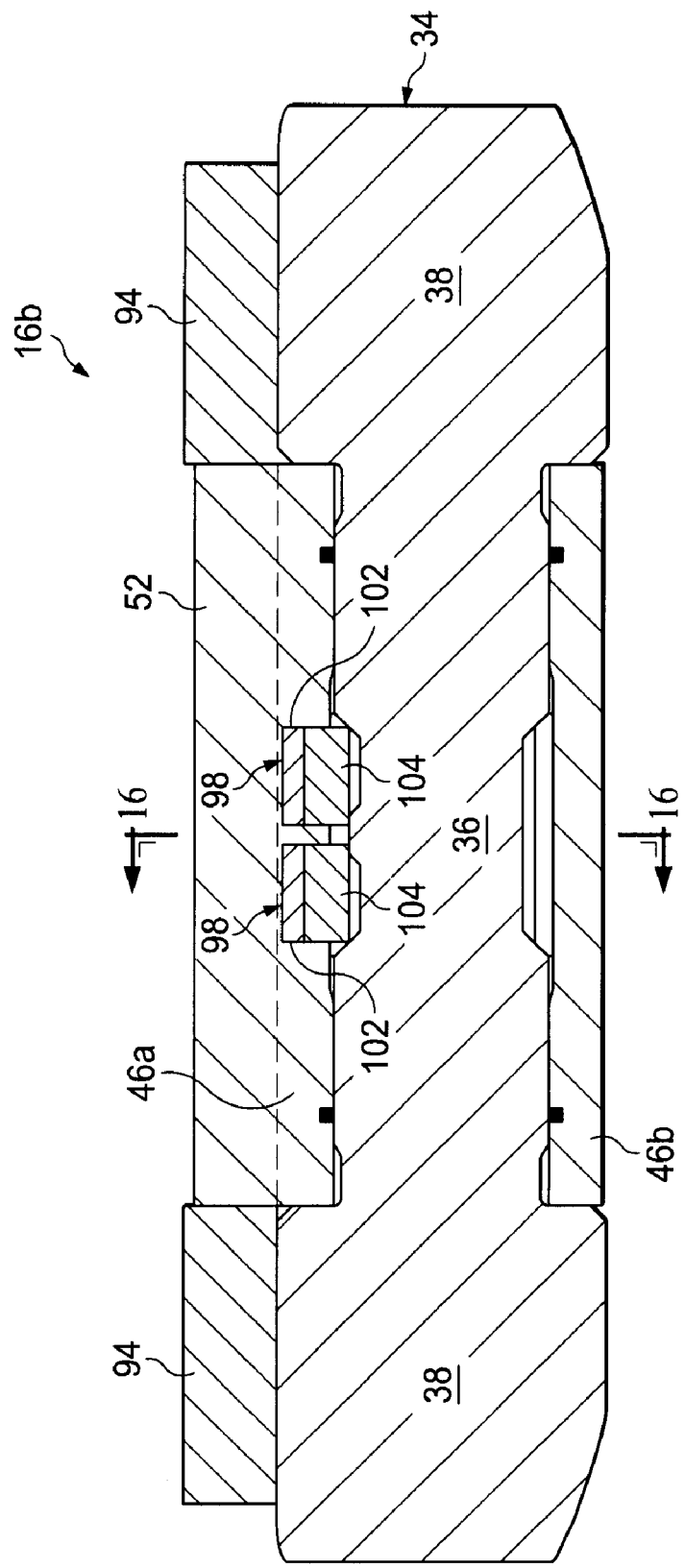
FIG. 14 is a laterally directed cross-sectional view through a second alternate connector pin assembly embodiment.

A second alternate embodiment 16*b* of the previously described connector pin assembly 16 is illustrated in FIG. 14. In the assembly 16*b* a first modification made to the connector pin assembly 16 is that the connector pin assembly 16*b* is provided with a pair of horizontally elongated shim members 94 which abut opposite ends of the rib portion 52 of the upper section 46*a* of the tubular housing 46. The shim members 94 extend along outer side surfaces of the pin member end portions 38 and illustratively are adhesively or magnetically secured to the opposite ends of the rib portion 52. Alternatively, the shim members 94 could be fabricated as integral portions of the rib portion 52. As shown in FIG. 14 the horizontally outer ends of the shim members 94 terminate somewhat inwardly of the outer ends of the pin member end portions 38.

Figure 15:
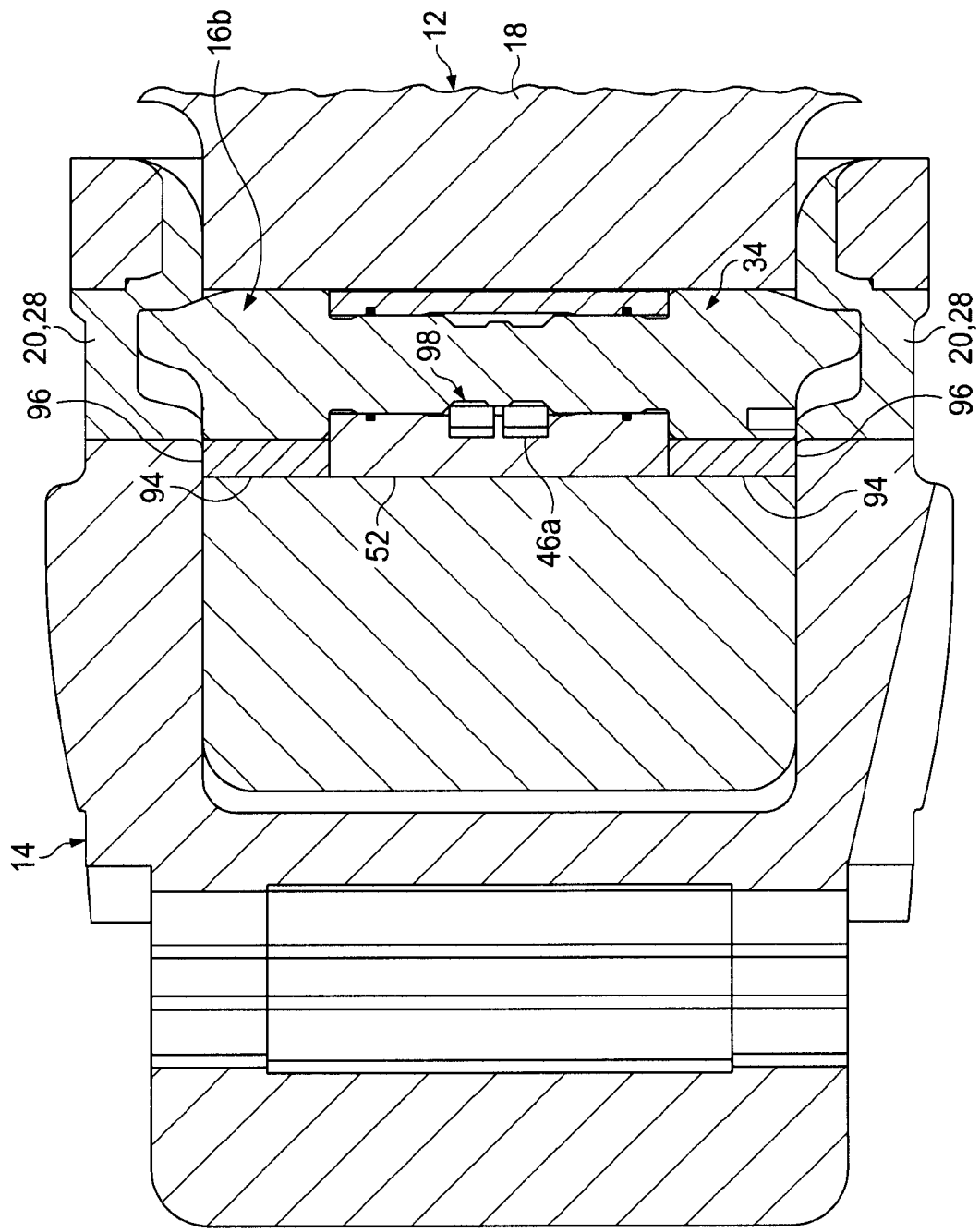
FIG. 15 is a reduced scale, vertically directed cross-sectional view through the ground engaging apparatus of FIG. 1 with the connector pin assembly of FIG. 14 operatively incorporated therein.

Referring now to FIG. 15, with the connector pin assembly 16*b* operatively installed within the aligned connector openings 20,28 of the support structure 12 and the wear member 14, the outer ends of the shim members 94 are inwardly adjacent inner side surface portions 96 of the wear member 14 which serve as abutments for the outer end portions of the shim members 94 that desirably maintain the installed connector pin assembly 16*b* in a longitudinally centered orientation within the telescoped support structure 12 and wear member 14.

Another modification made to the connector pin assembly 16 is that in the connector pin assembly 16*b* the three spring-loaded detent structures 56 in the connector pin assembly 16 (see FIG. 4) are replaced with two elastomer-based detent structures 98 received in underside surface pockets 100 formed in the upper housing portion 46*a*. Each detent structure 98 comprises a generally rectangular elastomeric member 102 received in an upper end of an associated pocket 100, and a metal detent member 104 received in a lower end of its associated pocket and projecting outwardly from the pocket.

Figure 16:
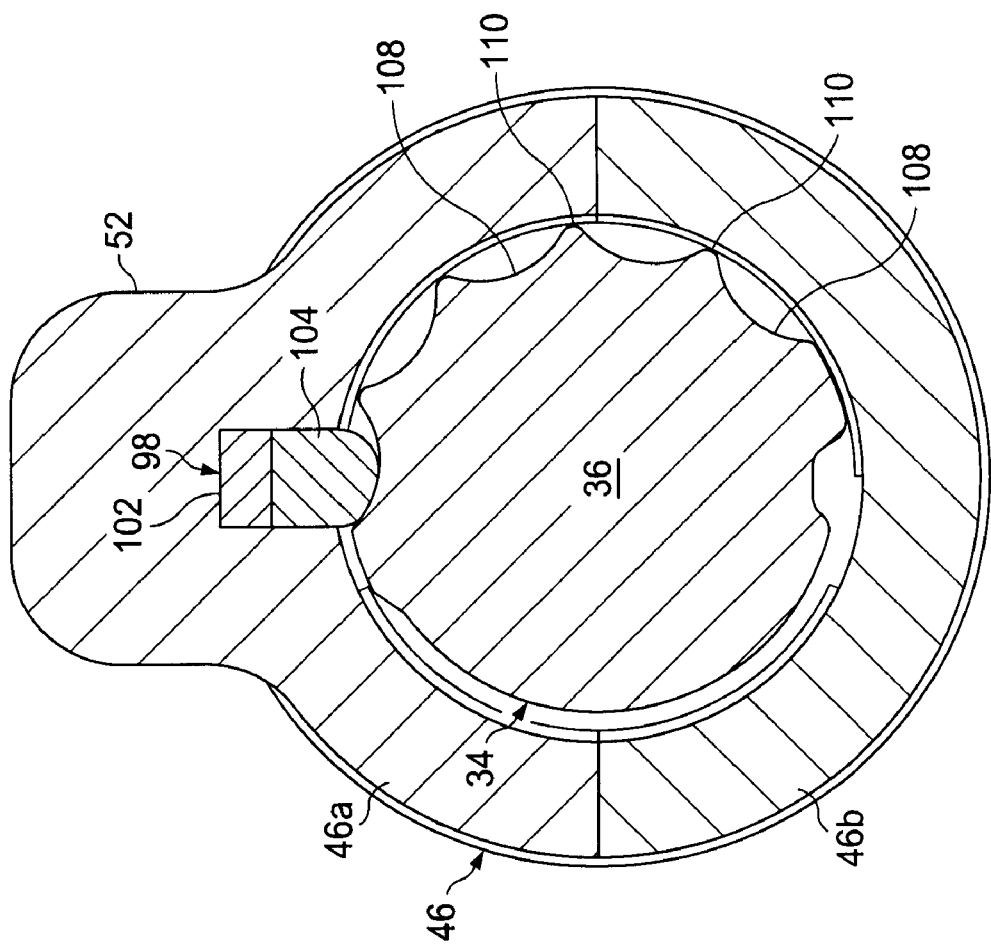
FIG. 16 is a cross-sectional view through the FIG. 14 connector pin assembly taken generally along line 16-16 of FIG. 14.
Figure 17:
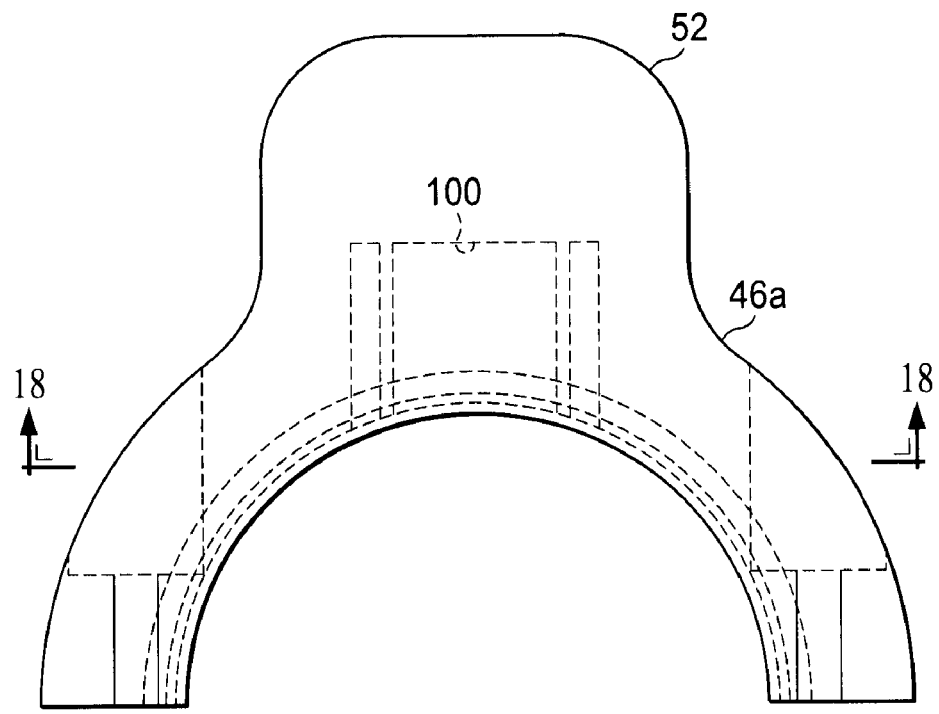
FIG. 17 is an enlarged scale partly phantomed end elevational view of the upper housing portion of the FIG. 14 connector pin assembly.
Figure 18:
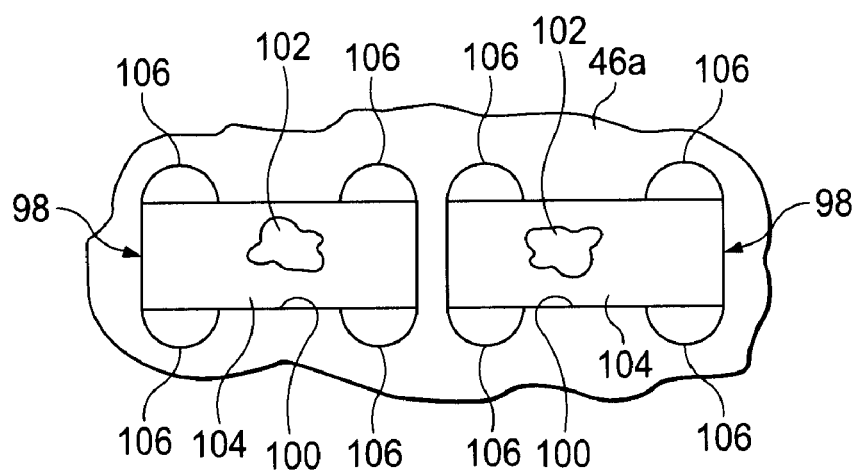
FIG. 18 is a bottom elevational view of part of the FIG. 17 upper housing portion taken generally along line 18-18 of FIG. 17.

Two other features are incorporated into the alternate connector pin assembly embodiment 16*b*. First, as best illustrated in FIG. 18, corner areas 106 of the detent pockets 100 are bulged outwardly to provide areas into which corresponding areas of the compressed elastomeric members 102 to flow into to prevent overstressing of the compressed members 102. Second, as may be best seen in FIG. 16, compared to the generally gear-shaped longitudinally extending pin member detent grooves 42 incorporated in the pin member 34 shown in FIG. 7, the corresponding longitudinally extending pin member grooves 108 shown in FIG. 16 are gently rounded and are circumferentially separated by lobes 110 having rounded outer tip portions to make for smoother rotational adjustment of the FIG. 16 pin member 34 relative to its associated housing 46 as the detent members 104 are snapped into successive ones of the rounded grooves 108.

In summary, neither of the connector pin assemblies 16, 16*a* and 16*b* has to be removed from the nose 18, to either install a wear member on or remove a wear member from the nose 18, and none of the connector pin assemblies has to be hammered into place within the nose 18. Moreover, periodic progressive tightening of the wear member 14 on the nose 18 may be easily and quickly achieved simply by rotating the pin member which is automatically held in its variety of rotationally adjusted orientations by the previously described rotational detent systems. Additionally, the uniquely configured cammed pin ends 64 and 90 serve both to retain the wear member 14 on the nose 18 and adjustably tighten it on the nose. In each of the representative connector pin assembly embodiments 16, 16*a* and 16*b* the distance between the cammed projection pairs 64 or 90 remains constant before, during and after wear member tightening adjustment as previously described above.

The foregoing detailed description is to be clearly understood as being given by way of illustration and example only, the spirit and scope of the present invention being limited solely by the appended claims.

What is claimed is:
1. For use in removably retaining a ground engaging wear member on an associated support structure portion having a connector opening therein, a connector pin assembly comprising:
   a hollow body longitudinally extending along an axis and being removably receivable in the connector opening, said hollow body having opposite end surfaces through which pin openings axially extend;
   a connector pin member having:
      a non-segmented longitudinally central body portion coaxially and rotatably received in said hollow body and extending from one of said opposite end surfaces of said hollow body to the other of said opposite end surfaces of said hollow body,
      opposite end portions exterior to said hollow body, said opposite end portions being laterally larger than said central body portion, said opposite end portions having axially spaced apart axially inwardly facing abutment surfaces disposed exteriorly to said hollow body and captively retaining said hollow body on said longitudinally central connector pin member body, por- tion, said opposite end portions of said connector pin member further having axially outwardly facing outer end surfaces, and locking/adjustment projections extending outwardly from portions of said outer end surfaces, each of said projections having an outer side surface with an eccentric curvature with respect to said axis; and detent apparatus for releasably retaining said connector pin member in selectively variable rotational orientations relative to said hollow body.

2. The connector pin assembly of claim 1 wherein:
said hollow body has a generally tubular configuration and is formed from two releasably interconnected lateral portions.

3. The connector pin assembly of claim 1 wherein:
said hollow body has a length and a non-circular cross-section along said length.

4. The connector pin assembly of claim 3 wherein:
said hollow body has a lateral lobe extending along a side portion thereof.

5. The connector pin assembly of claim 1 wherein:
each of said projections is laterally offset from said axis.

6. The connector pin assembly of claim 1 wherein:
at least one of said outer end surfaces has a noncircular drive opening extending inwardly therethrough.

7. The connector pin assembly of claim 1 wherein said detent apparatus comprises:
a circumferentially spaced series of axially extending detent grooves formed in the side surface of said longitudinally central portion of said connector pin member, and at least one spring-loaded detent member positioned to operatively snap into a selectively variable one of said grooves in response to relative rotation between said hollow body and said connector pin member.

8. The connector pin assembly of claim 1 wherein said detent apparatus comprises:
a circumferentially spaced series of axially extending detent grooves formed in the side surface of said longitudinally central portion of said connector pin member,
a recess formed in said hollow body,
an elastomeric member carried in an inner portion of said recess, and
a rigid detent member carried in an outer portion of said recess and inwardly movable to compress said elastomeric member and then resiliently snap into a selectively variable one of said detent grooves.

9. The connector pin assembly of claim 8 wherein:
said recess has an expansion area for receiving portions of said elastomeric member when it is under compression to limit compressive overstressing of said elastomeric member.

10. The connector pin assembly of claim 9 wherein:
said recess has a generally rectangular cross-section, and said expansion area is defined by outwardly bulging corner portions of said recess.

11. The connector pin assembly of claim 1 further comprising:
cooperatively engageable abutment structures carried by said longitudinally central portion of said connector pin member and said hollow body and being operable to limit the total amount of relative rotation between said connector pin member and said hollow body.

12. The connector pin assembly of claim 1 wherein:
each of said projections is disposed within the peripheral envelope of its associated outer end surface.

13. The connector pin assembly of claim 1 wherein:
each of said projections has a portion laterally projecting outwardly beyond the peripheral envelope of its associated outer end surface.

14. The connector pin assembly of claim 13 wherein:
said portion laterally projecting outwardly beyond the peripheral envelope of its associated outer end surface includes the outer side surface of the projection having said eccentric curvature.

15. The connector pin assembly of claim 1 wherein:
said connector pin member comprises two axial portions secured to one another in a fixed relationship.

16. The connector pin assembly of claim 15 wherein:
one of said two axial portions is an end portion of said connector pin member.

17. The connector pin assembly of claim 4 wherein:
said lateral lobe has opposite ends spaced axially inwardly from end surfaces of said opposite end portions of said connector pin member, and
said connector pin member further has shim portions extending longitudinally outwardly from opposite ends of said lateral lobe.

18. The connector pin assembly of claim 17 wherein:
said shim portions are attachable to said lateral lobe.

19. The connector pin assembly of claim 16 wherein:
said non-segmented longitudinally central body portion of said connector pin member has a longitudinal portion projecting outwardly beyond one of said opposite end surfaces of said hollow body, and
said one of said two axial portions is telescopingly connected with said outwardly projecting longitudinal portion.

20. For use in removably retaining a ground engaging wear member on an associated support structure portion having a connector opening therein, a connector pin assembly comprising:
a hollow body longitudinally extending along an axis and being removably receivable in the connector opening, said hollow body having opposite end surfaces through which pin openings axially extend;
a connector pin member having:
a longitudinally central portion coaxially and rotatably received in said hollow body,
opposite end portions exterior to said hollow body, said opposite end portions being laterally larger than said central portion, having abutment surfaces captively retaining said hollow body on said longitudinally central connector pin member portion, and having axially facing outer end surfaces, and
locking/adjustment projections extending outwardly from portions of said outer end surfaces, each of said projections having an outer side surface with an eccentric curvature with respect to said axis; and
cooperating detent structures on said hollow body and said longitudinally central portion of said connector pin member for releasably retaining said connector pin member in selectively variable rotational orientations relative to said hollow body,
said connector pin member being of a one piece construction.

21. Ground engaging apparatus comprising:
a support structure having a nose portion through which a first connector opening extends;
a hollow wear member rearwardly telescoped onto said nose portion, said wear member having a rear end, opposite side walls with second and third connector openings extending therethrough into the interior of said wear member and being aligned with said first connector opening, and recesses formed in interior surfaces of said opposite side walls, said recesses extending forwardly through said rear end into said second and third connector openings;
a hollow body longitudinally extending along an axis and being removably and nonrotatably received in said first connector opening, said hollow body having axially facing outer end surfaces;
a connector pin member having axially facing outer end surfaces, and locking/adjustment projections having eccentrically curved outer side surfaces and extending outwardly from portions of said outer end surfaces of said connector pin member into said second and third connector openings, said connector pin member having a non-segmented, longitudinally central body portion coaxially and rotatably received in said hollow body and extending from one of said outer end surfaces of said hollow body to the other of said outer end surfaces of said hollow body, and opposite end portions laterally larger than said central body portion and having axially spaced apart axially inwardly facing abutment surfaces transverse to said axis and external to said hollow body, said abutment surfaces captively retaining said hollow body on said connector pin member, said connector pin member further being rotatable to:
  a first position in which said projections move rearwardly through and then exit said recesses as said wear member is forwardly removed from said nose portion,
  a second position in which said eccentrically curved outer side surfaces engage surfaces of said second and third connector openings in a manner blocking forward removal of said wear member from said nose portion, and
  a third position in which, in response to rotation of said connector pin member from said second position to said third position, said eccentrically curved outer side surfaces forcibly engage said surfaces of said second and third connector openings in a manner rearwardly moving said wear member along said nose portion to tighten said wear member thereon; and
detent apparatus for releasably holding said connector pin member in a selectively variable rotational orientation relative to said nose portion.

22. The ground engaging apparatus of claim 21 wherein: said support structure is an adapter.

23. The ground engaging apparatus of claim 22 wherein: said adapter is a base adapter.

24. The ground engaging apparatus of claim 22 wherein: said adapter is an intermediate adapter.

25. The ground engaging apparatus of claim 21 wherein: said wear member is a tooth point.

26. The ground engaging apparatus of claim 21 wherein: said wear member is an adapter.

27. The ground engaging apparatus of claim 21 wherein: said detent apparatus comprises cooperating detent structures on said hollow body and said longitudinally central portion of said connector pin member.

28. The ground engaging apparatus of claim 27 wherein: said hollow body has a generally tubular configuration and is formed from two releasably interconnected lateral portions.

29. The ground engaging apparatus of claim 27 wherein: said hollow body has a length and a non-circular cross-section along said length.

30. The ground engaging apparatus of claim 29 wherein: said hollow body has a lateral lobe extending along a side portion thereof.

31. The ground engaging apparatus of claim 27 wherein: each of said projections is laterally offset from the axis of said connector pin member.

32. The ground engaging apparatus of claim 27 wherein: at least one of said outer end surfaces has a noncircular drive opening extending inwardly therethrough.

33. The ground engaging apparatus of claim 27 wherein said detent apparatus comprises:
  a circumferentially spaced series of axially extending detent grooves formed in the side surface of said longitudinally central portion of said connector pin member, and
  at least spring-loaded detent member positioned to operatively snap into a selectively variable one of said grooves in response to relative rotation between said hollow body and said connector pin member.

34. The ground engaging apparatus of claim 27 wherein said cooperating detent structures on said hollow body and said longitudinally central portion of said connector pin member comprise:
  a circumferentially spaced series of axially extending detent grooves formed in the side surface of said longitudinally central portion of said connector pin member,
  a recess formed in said hollow body,
  an elastomeric member carried in an inner portion of said recess, and
  a rigid detent member carried in an outer portion of said recess and inwardly movable to compress said elastomeric member and then resiliently snap into a selectively variable one of said detent grooves.

35. The ground engaging apparatus of claim 34 wherein: said recess has an expansion area for receiving portions of said elastomeric member when it is under compression to limit compressive overstressing of said elastomeric member.

36. The ground engaging apparatus of claim 35 wherein: said recess has a generally rectangular cross-section, and said expansion area is defined by outwardly bulging corner portions of said recess.

37. The ground engaging apparatus of claim 27 further comprising:
  cooperatively engageable abutment structures carried by said longitudinally central portion of said connector pin member and said hollow body and being operable to limit the total amount of relative rotation between said connector pin member and said hollow body.

38. The ground engaging apparatus of claim 21 wherein: each of said projections is disposed within the peripheral envelope of its associated outer end surface.

39. The ground engaging apparatus of claim 21 wherein: each of said projections has a portion laterally projecting outwardly beyond the peripheral envelope of its associated outer end surface.

40. The ground engaging apparatus of claim 39 wherein: said portion laterally projecting outwardly beyond the peripheral envelope of its associated outer end surface includes the outer side surface of the projection having said eccentric curvature.

41. The ground engaging apparatus of claim 21 wherein: said connector pin member comprises two axial portions secured to one another in a fixed relationship.

42. The ground engaging apparatus of claim 41 wherein: one of said two axial portions is an end portion of said connector pin member.

43. The ground engaging apparatus of claim 30 wherein:
said lateral lobe has opposite ends spaced axially inwardly from end surfaces of said opposite end portions of said connector pin member, and
said connector pin member further has shim portions extending longitudinally outwardly from opposite ends of said lateral lobe.

44. The ground engaging apparatus of claim 43 wherein:
said shim portions are attachable to said lateral lobe.

45. The ground engaging apparatus of claim 42 wherein:
said non-segmented longitudinally central body portion of said connector pin member has a longitudinal portion projecting outwardly beyond one of said opposite end surfaces of said hollow body, and
said one of said two axial portions is telescopingly connected with said outwardly projecting longitudinal portion.

46. Ground engaging apparatus comprising:
a support structure having a nose portion through which a first connector opening extends;
a hollow wear member rearwardly telescoped onto said nose portion, said wear member having a rear end, opposite side walls with second and third connector openings extending therethrough into the interior of said wear member and being aligned with said first connector opening, and recesses formed in interior surfaces of said opposite side walls, said recesses extending forwardly through said rear end into said second and third connector openings; and
a connector pin member rotatable supported within said first connector opening and having a fixed length, axially facing outer end surfaces, and locking/adjustment projections having eccentrically curved outer side surfaces and extending outwardly from portions of said outer end surfaces into said second and third connector openings, said connector pin member being rotatable to:
  a first position in which said projections move rearwardly through and then exit said recesses as said wear member is forwardly removed from said nose portion,
  a second position in which said eccentrically curved outer side surfaces engage surfaces of said second and third connector openings in a manner blocking forward removal of said wear member from said nose portion, and
  a third position in which, in response to rotation of said connector pin member from said second position to said third position, said eccentrically curved outer side surfaces forcibly engage said surfaces of said second and third connector openings in a manner rearwardly moving said wear member along said nose portion to tighten said wear member thereon; and
detent apparatus for releasable holding said connector pin member in a selectively variable rotational orientation relative to said nose portion,
said connector pin member being of a one piece construction.

* * * * *